Jan. 16, 1945.   L. S. RENZONI   2,367,239
PURIFICATION OF COBALT PRECIPITATES
CONTAINING IRON AND OTHER IMPURITIES
Filed Jan. 15, 1943
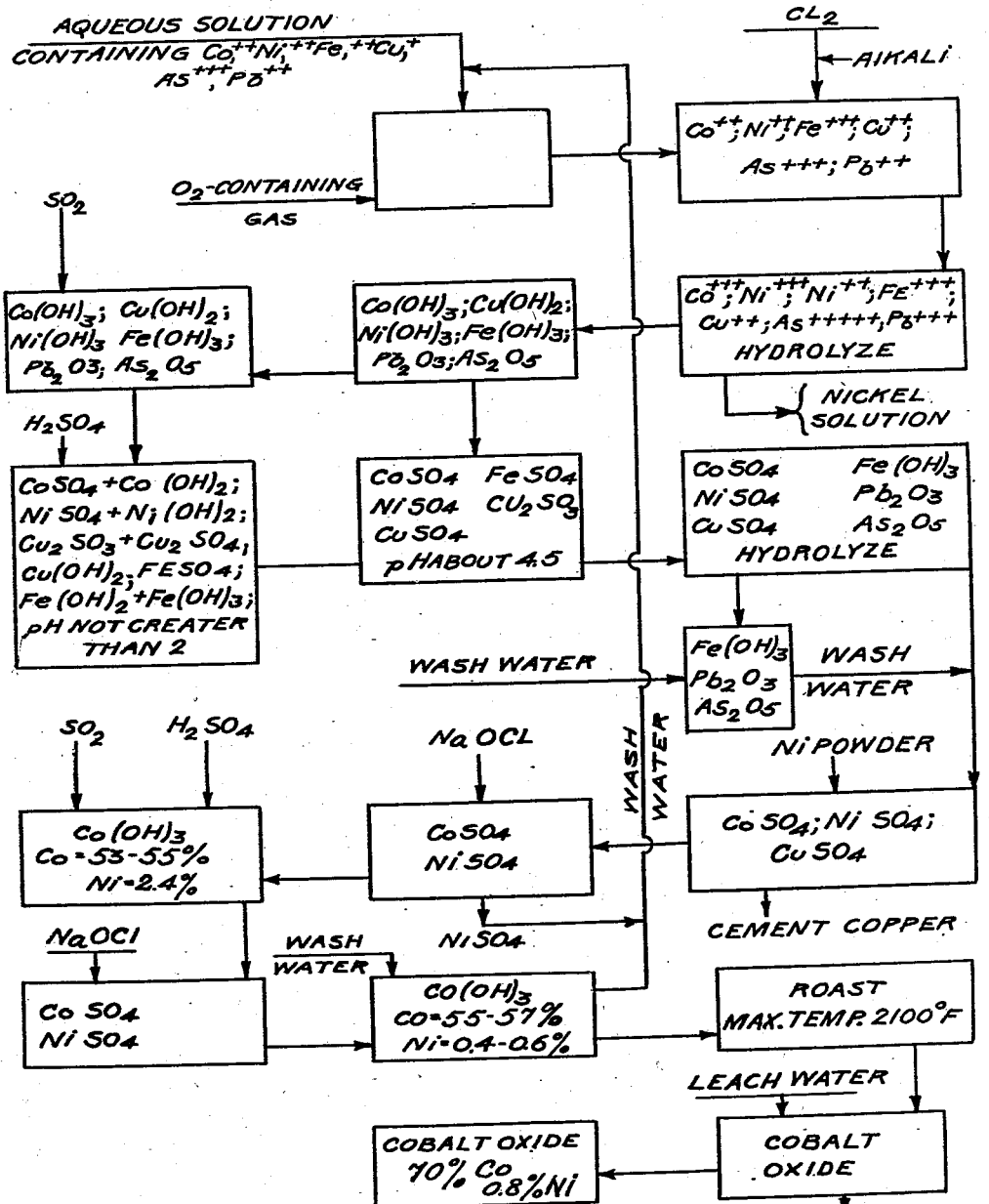
INVENTOR.
LOUIS S. RENZONI
BY
ATTORNEY Patented Jan. 16, 1945

2,367,239

UNITED STATES PATENT OFFICE 2,367,239

PURIFICATION OF COBALT PRECIPITATES CONTAINING IRON AND OTHER IMPURITIES

Louis Secondo Renzoni, Port Colborne, Ontario, Canada, assignor to The International Nickel Company, Inc., New York, N. Y., a corporation of Delaware Application January 15, 1943, Serial No. 472,472
In Canada October 16, 1942

5 Claims. (Cl. 75—119)

The present invention relates to the purification of cobalt precipitates containing iron, cobalt, nickel and other impurities, and more particularly to the purification and recovery of high grade cobalt from precipitates obtained in the purification of electrolytes employed in the electrolytic refining of nickel. Such precipitates contain not only cobalt, but also copper, iron, arsenic, lead and nickel.

Heretofore it has been customary when electro-refining nickel to purify the electrolyte by precipitation of various contaminants, such as iron, copper and cobalt. In prior art operations the iron and the copper have been removed by one process or another before any attempt has been made to precipitate the cobalt and remove the cobalt from the nickel electrolyte. Consequently, the cobalt precipitates of prior art processes have been devoid, or substantially devoid, of iron or, at the most, have contained only 1 or 2% of iron. Such cobalt precipitates, consisting primarily of cobalt and nickel, have been produced in prior art processes by oxidizing the cobalt with hypochlorite under carefully controlled conditions and precipitating the cobalt in the highest state of oxidation by means of an alkali, such as sodium, or an alkaline earth, such as calcium. In the conventional prior art process, the oxidizing agent and the precipitating alkali were added to the electrolyte as a hypochlorite. Thus, sodium hypochlorite and calcium hypochlorite have been employed as oxidizing and precipitating agents for removing cobalt from various solutions.

Another process which has been employed has involved precipitation of cobalt by the addition of nickel peroxide. The nickel peroxide oxidizes the cobalt and the cobalt in solution is replaced by the nickel as a result of which the cobalt is precipitated as an oxide.

In all of the prior art processes, the cobalt precipitate has been purified by solution in acids and re-precipitated with alkali or an alkaline agent or with sodium hypochlorite. However, none of the processes known to the art has been employed to purify cobalt precipitates containing appreciable amounts of iron and, in addition, arsenic and lead in amounts greater than usually considered as traces. Thus, the art has been confronted with the problem of purifying cobalt precipitates containing, in addition to nickel, large amounts of iron and appreciable amounts of lead and arsenic. So far as it has been ascertained, no solution has been provided for this problem.

It is an object of the present invention to provide a means for purifying cobalt precipitates containing appreciable amounts of iron as well as arsenic, lead, copper and nickel whereby there is obtained a cobalt precipitate of sufficient purity to be satisfactory directly for industrial purposes.

It is another object of the present invention to provide a means for purifying cobalt precipitates containing lead, arsenic and appreciable amounts of iron in addition to nickel and copper, wherein the cobalt precipitate is subjected to the action of a reducing agent such as sulphur dioxide to solubilize the various metals present, followed by treatment with an oxidizing agent to oxidize and precipitate the iron, lead and arsenic substantially devoid of cobalt.

It is a further object of the present invention to provide a process for removing iron, arsenic, lead and cobalt, together with some copper, from nickel electrolytes to provide a partially purified nickel electrolyte and a precipitate containing substantially all the cobalt present in the electrolyte together with lead, arsenic and large amounts of iron and to recover cobalt in a highly purified state substantially devoid of iron, arsenic, lead and nickel from the aforesaid precipitate.

The invention likewise contemplates the treatment of cobalt precipitates containing arsenic, lead, relatively large amounts of iron, copper and nickel, with a reducing agent such as sulphur dioxide followed by treatment with an oxidizing agent such as further amounts of the first cobalt precipitate and subsequent separation of the iron to leave a solution substantially devoid of iron, arsenic and lead.

Other objects and advantages will become apparent from the following description taken in conjunction with the figure which depicts in a more or less diagrammatic manner the flow sheet of a process for recovering cobalt by precipitation from an aqueous solution containing cobalt and purifying the cobalt precipitate so obtained in accordance with the present invention.

Broadly stated, the purification of cobalt precipitates containing arsenic, lead and relatively large amounts of iron together with copper and nickel involves a treatment with a reducing agent and a solubilizing agent to produce a solution in which the nickel and cobalt are in the lower state of oxidation while the iron, arsenic and lead remain in the oxidized state. In the reduced state the nickel and cobalt are readily soluble at pH 4.5 whereas the iron, arsenic and lead are not. Under rigidly controlled conditions it is possible to stop the reaction at the point where only cobalt and nickel are reduced and in a state which for convenience is called the "acid soluble" state. At this point sufficient acid may be added to convert the reduced hydroxides or "acid soluble" hydroxides to soluble salts and thus obtain a solution relatively free from iron, arsenic and lead and containing about 75 to 80% of the total cobalt, nickel and copper. However, to allow for ease of control and for the highest possible metals recovery, it is preferred to allow the reduction reaction to proceed beyond this stage and to reduce some of the copper and iron and then to add sufficient acid to dissolve the slime completely. After complete solution of the slime at pH 1.5 to 2.0, the solution contains cobaltous, nickelous, cuprous and cupric and ferrous ions and some cuprous sulfite separates out as a salt. This solution will selectively reduce and dissolve cobalt and nickel from an additional quantity of primary slime due to the reducing action of the cuprous sulfite and ferrous ions. Thus the sulfur dioxide consumed for the reduction of iron and copper is not lost since the ferrous and cuprous ions in turn act as selective reducing agents toward the cobalt and nickel contained in the primary slime. As the nickel and cobalt are reduced and enter solution, the ferrous and cuprous ions are oxidized, the pH rises, and under proper conditions the iron is completely hydrolyzed. Arsenic and lead are precipitated with iron, and the result is a solution of cobalt, nickel and copper, essentially free from iron, arsenic and lead. The copper is removed by cementation to leave a solution containing practically no copper and containing 98% of the cobalt and nickel of the original precipitate. The cobalt is recovered from the solution of cobalt and nickel salts by oxidation with a hypochlorite and precipitation with an alkali. It is well known that by careful operation a cobalt precipitate of high purity can be obtained from a solution containing practically nothing but cobalt and nickel salts. However, under such conditions, an appreciable amount of cobalt remains in solution. On the other hand, all of the cobalt can be precipitated, but a certain amount of nickel is re-precipitated. It is preferred to add sufficient hypochlorite and precipitating agent to precipitate all the cobalt, together with a small amount of nickel, and to purify this precipitate by reduction with a reducing agent and solution in acid followed by re-precipitation with hypochlorite and alkali until a cobalt precipitate of required purity is obtained.

The flow sheet of the drawing is illustrative of the steps of obtaining a cobalt precipitate from an aqueous solution containing cobalt, nickel, iron, copper, arsenic and lead and the purification of that precipitate to obtain high grade cobalt. Thus, an aqueous solution containing nickel and at least some cobalt, iron, arsenic and lead in the reduced state is treated with oxygen containing gas selected from the group consisting of oxygen and air to obtain a reaction mass containing iron in the oxidized state. The reaction mass containing iron in the oxidized state is then treated with chlorine to obtain a reaction mass containing cobalt, lead and arsenic together with iron in the oxidized state. The pH of the mass is adjusted to permit the iron salts to hydrolyze and precipitate the iron as the hydroxide or hydrated oxide. This is conveniently done by adding alkali. Cobalt, copper, nickel, lead and arsenic likewise precipitate and form a first precipitate containing cobalt, iron, arsenic, lead, copper and nickel. The first precipitate is suspended in an aqueous medium and sufficient sulfur dioxide is introduced into said aqueous medium to reduce practically all of the cobalt and nickel and at least a part of the iron. Sufficient sulfuric acid is then added to the aqueous medium to bring the pH of the aqueous medium to below about pH 2.0 to obtain an aqueous medium containing soluble salts of cobalt, nickel and iron in the reduced state together with compounds of copper. To this aqueous medium containing soluble salts of cobalt, nickel and iron in the reduced state sufficient of an oxidizing agent, preferably the first precipitate, is added to oxidize the reduced iron, but not the cobalt and nickel and to provide a solution having a pH of about pH 4.5 in which practically all of the iron is present in the oxidized state and practically all of the cobalt and nickel are present as soluble salts of reduced cobalt and nickel. At pH 4.5 the oxidized iron will hydrolyze to form a precipitate of oxidized iron, lead and arsenic. This precipitate of oxidized iron, lead and arsenic is separated from the aqueous medium and washed with water. The wash water is combined with the aqueous medium. The aqueous medium now contains the sulfates of cobalt, nickel and copper. This solution of sulfates of cobalt and nickel in the reduced state and of copper is then treated with nickel powder to cement out the copper which is separated from the solution of cobalt and nickel sulfate in the reduced state. The solution of reduced cobalt and nickel salts is then treated with an oxidizing agent such as sodium hypochlorite which precipitates the cobalt. The cobalt precipitate is separated from the nickel sulfate solution which is returned to the first step of the operation. The precipitate of cobalt contains about 2.4% nickel and is treated with a reducing agent such as sulfur dioxide and taken into solution with sulfuric acid. The solution of cobalt sulfate and nickel sulfate is then treated with an oxidizing agent such as sodium hypochlorite and the cobalt again precipitated. This cobalt precipitate only contains about 0.4% to about 0.6% nickel. This low nickel cobalt precipitate is washed with water and the wash water returned to the first step of the operation. The washed cobalt precipitate is then roasted at a temperature not greater than about 2100° F. to obtain a cobalt oxide. This cobalt oxide is leached with water to remove water soluble sulfur salts and produce a cobalt oxide which on drying assays about 70% cobalt and about 0.8% nickel.

The following is an illustrative example of the application of the principles of the present invention to the treatment of a cobalt precipitate containing relatively large amounts of iron.

A cobalt precipitate having the following composition was treated in the following manner:

| Constituents | Per cent |
| --- | --- |
| Iron | About 6.00 |
| Arsenic | About 0.56 |
| Lead | About 0.10 |
| Copper | About 5.9 |
| Nickel | About 20.8 |
| Cobalt | About 14.8 |

About 876 pounds of primary cobalt slime having the composition set forth hereinbefore was suspended in 25 cubic feet of water at 100° F. and $SO_2$ was passed into the suspension until the pH reached a value of about 4.5. This required that about 120 pounds of sulfur dioxide be introduced into the suspension in a period of about 5 hours, during which time the temperature of the suspension rose to about 120° F. The pH of the suspension before the addition of $SO_2$ was about 4.5 and increased to about 6.5 during the introduction of the first portions of the $SO_2$. However, after 120 pounds of $SO_2$ had been added, the pH of the suspension was about the same as at the beginning of the treatment, to wit, about pH 4.5. After 120 pounds of $SO_2$ had been added to the solution, about 200 pounds of sulphuric acid (66° Baumé) were added and the pH of the resulting solution was about 1.5. Thereafter, about 165 pounds of primary cobalt slime having the composition set forth hereinbefore was added to the solution and the temperature raised to about 180° F. The pH of the suspension rose to about 4.5 and the iron was precipitated, probably as ferric hydroxide. The ferric hydroxide was removed by filtration and the ferric slime washed with water. The washings were combined with the original filtrate and the total solution had the following composition:

| Constituents | Grams per liter |
| --- | --- |
| Iron | About 0.001 |
| Copper | About 5.2 |
| Nickel | About 28.0 |
| Cobalt | About 20.0 |

The ferric slime had the following composition:

| Constituents | Percent |
| --- | --- |
| Iron | About 38 |
| Copper | About 6.6 |
| Nickel | About 2.7 |
| Cobalt | About 1.5 |
| Arsenic | About 3.5 |

The iron-free solution comprising the filtrate and washings from the ferric slime was treated for the removal of copper by cementation, preferably with gas-reduced nickel powder. A filtrate was obtained containing:

| Constituents | Grams per liter |
| --- | --- |
| Iron | About 0.003 |
| Copper | About 0.001 |
| Nickel | About 35 |
| Cobalt | About 20 |

In the event that the gas-reduced nickel contains a small amount of iron, it is desirable, and in fact essential, to aerate the filtrate from the copper cementation to precipitate any additional iron which has been picked up during the copper cementation operation. This iron precipitate can then be removed by filtration.

The cobalt and nickel are separated by oxidation and hydrolysis of the cobalt by the action of alkaline sodium hypochlorite. The oxidizing and precipitating agent employed is an aqueous solution of hypochlorite containing about 20 grams per liter total chlorine and prepared by adding chlorine to soda ash in the proportion of about 1 pound of chlorine to about 3.90 pounds of soda ash. This provides a solution containing about 87% of the theoretical quantity of alkali, i. e., a solution having a slightly lower than theoretical alkali to available chlorine ratio. The precipitation based on the following reaction, $$2CoSO_4 + Cl_2 + 3Na_2CO_3 + 3H_2O \rightarrow 2Co(OH)_3 + 2NaCl + 2Na_2SO_4 + 3CO_2$$

was carried out at pH 2.3 and 100° F. until the residual cobalt content of the solution was reduced to about 0.2 grams per liter. The cobalt precipitate produced contained 53 to 55 per cent cobalt and 2 to 4 per cent nickel. The precipitate was allowed to settle and the supernatant nickel solution decanted. The cobalt precipitate was re-suspended in water and re-dissolved by the action of sulfur dioxide and sulfuric acid, the pH of the resulting solution being about 2.0. This solution was obtained substantially devoid of dissolved sulfur dioxide by adding 42 pounds of acid after 34 pounds of sulfur dioxide had been added to the suspension of the first cobalt slime. The cobalt was precipitated from this solution by the addition of alkaline hypochlorite and washed twice, preferably by decantation, after which it was filtered. The second cobalt slime contained 55 to 57% cobalt and about 0.4 to about 0.6% nickel. The solution from which the second cobalt slime was precipitated had a residual cobalt content of about 0.2 gram per liter. This second cobalt slime was then roasted at a maximum temperature of 2100° F. and the roasted product leached to remove soluble sulfur salts. The product produced by roasting and leaching had the following composition:

| Constituents | Per cent |
| --- | --- |
| Cobalt | About 70 |
| Nickel | About 0.80 |
| Iron | About 0.28 |
| Copper | About 0.20 |
| Sulfur | About 0.03 |
| Arsenic | About 0.003 |
| Lead | About 0.001 |

Similar products containing 70% cobalt, 0.6 to 0.8% nickel and 0.2% iron, 0.1% copper and 0.2% manganese can be obtained by employing the principles of the present invention.

A specific example, illustrative, but not restrictive of the operation of the present invention, is as follows:

Considering the treatment of a primary cobalt-bearing iron slime having the following composition:

| Constituents | Per cent |
| --- | --- |
| Moisture | About 50 |
| Cobalt | About 14.8 |
| Nickel | About 20.8 |
| Iron | About 6.00 |
| Copper | About 5.9 |
| Arsenic | About 0.56 |
| Lead | About 0.10 |

876 pounds of the moist slime were suspended in 25 cubic feet of water at 100° F., and sulfur dioxide passed through the suspension until the pH reached a value of 4.5. At this stage, 64.8 pounds of cobalt, 91 pounds of nickel, 12.1 pounds of copper, and 1.6 pounds of iron were in the reduced state, while 13.7 pounds of copper, and 24.7 pounds of iron remained in the oxidized state. 200 pounds of sulfuric acid were then added and the slime completely dissolved, the final pH of the solution being 1.5. On standing, crystals of cuprous sulphite separated from the solution. To this solution, an additional 165 pounds of primary slime was added and the temperature was raised to 180° F. The cuprous sulfite and ferrous ions preferentially reduced the cobaltic and nickellic hydroxides and rendered them soluble. At the same time an equivalent amount of cupric and ferric ions were formed. The pH of the solution rose as a result of the dissolution of cobalt and nickel, and substantially complete iron hydrolysis took place. Under the strongly oxidizing conditions, arsenic and lead were also oxidized and co-precipitated with the iron. The result was a solution containing about 98% of the total cobalt, about 98% of the total nickel and about 82% of the total copper, and a secondary iron slime containing practically all of the iron, arsenic and lead.

The reactions involved in the treatment of the slime may be expressed as follows:

(I) Reduction of cobalt and nickel with sulfur dioxide.

$$2Co(OH)_3 + SO_2 \rightarrow CoSO_4 + Co(OH)_2 + 2H_2O$$

Nickel plus cobalt is expressed as cobalt.

(II) Reduction of copper.

(a) $$2Cu(OH)_2 + SO_2 \rightarrow Cu_2SO_4 + 2H_2O$$

(b) $$Cu_2SO_4 + SO_2 + H_2O \rightarrow Cu_2SO_3 + H_2SO_4$$

(III) Reduction of iron.

$$2Fe(OH)_3 + SO_2 \rightarrow FeSO_4 + Fe(OH)_2 + 2H_2O$$

(IV) Upon the additon of sulfuric acid, the reduced cobalt, nickel and iron hydroxides were dissolved and ferric hydroxide reacted with cuprous sulfite as follows:

$$Cu_2SO_3 + 4Fe(OH)_3 + 5H_2SO_4 \rightarrow 2CuSO_4 + 4FeSO_4 + 11H_2O$$

In all, 24.7 pounds of iron were reduced in this manner, and consequently 11.3 pounds of cuprous copper were oxidized.

After the addition of sulfuric acid, the following conditions existed in the solution: pH 1.5, Co++ 64.8 pounds, Ni++ 91.2 pounds, Fe++ 26.3 pounds, Cu++ 25.0 pounds, $Cu_2$++ 0.8 pound.

To oxidize and hydrolyze all of the iron, and to utilize the reducing properties of the solution, an additional 163.16 pounds of primary slimes were required, and the nickel and cobalt contained therein entered the solution as follows: (I) Reduction by cuprous sulfite followed by a rise in solution pH; and (II) Reduction by ferrous ions followed by iron hydrolysis to form ferric hydroxide.

The dried slime contained 35.6% nickel plus cobalt, which for this purpose may be considered as being all cobalt. Acid neutralized in raising the pH from 1.5 to 4.5=3.0 pounds $H_2SO_4$. The acid was neutralized according to the following reaction:

$$Cu_2SO_3 + 4Co(OH)_3 + 5H_2SO_4 \rightarrow 2CuSO_4 + 4CoSO_4 + 11H_2O$$

Cuprous copper required to neutralize acid $= \frac{127.14}{490} \times 3.0 = 0.78$ pound copper.

Cobalt reduced $= \frac{0.78 \times 235.76}{127.14} = 1.45$ pounds cobalt.

Dried slime required $= \frac{1.45}{0.356} = 4.08$ pounds.
Wet slime required = 8.16 pounds slime.
Weight of iron to be oxidized and hydrolyzed = 26.3 pounds.
Cobalt and nickel required by the following reaction, $$FeSO_4 + Co(OH)_3 \rightarrow CoSO_4 + Fe(OH)_3 = \frac{58.94}{55.84} \times 26.3 = 27.7 \text{ pounds.}$$

Weight of wet slime required $= \frac{27.7}{0.356} \times 2 = 155$ pounds slime.
Total weight of slime to be added = 163.16 pounds.

From the foregoing it is clear that if the reduction with sulfur dioxide is carried beyond the complete reduction of cobalt and nickel, a certain minimum cuprous copper content is required at the time of acid addition. This is equivalent to approximately 0.5 times the iron present as ferric hydroxide. With this amount of cuprous copper present, the iron is completely reduced upon acid addition, and sufficient cuprous sulfite remains to allow the pH to rise from 1.5 to 4.5 upon the addition of a sufficient quantity of primary iron slime. If lesser amounts of cuprous copper are present the pH of the solution will not rise to the value required for complete iron hydrolysis. If larger amounts of cuprous copper are present, no problem is presented since the pH may be kept at the proper value by acid additions.

Although the present invention has been described in conjunction with certain specific embodiments thereof, it is to be understood that the primary cobalt slimes may have a composition within the following range:

| Constituents | Percentages |
|---|---|
| Iron | About 5 to about 15 |
| Arsenic | About 0.3 to about 0.7 |
| Lead | About 0.1 to about 0.2 |
| Manganese | About 0.1 to about 0.2 |
| Copper | About 3 to about 10 |
| Nickel | About 15 to about 25 |
| Cobalt | About 5 to about 15 |

The filtrate from the ferric slime may have a composition within the following range:

| Constituents | Grams per liter |
|---|---|
| Iron | About 0.001 to about 0.005 |
| Arsenic | About 0.0001 to about 0.0006 |
| Lead | About 0.0001 to about 0.0005 |
| Manganese | About 0.03 to about 0.05 |
| Copper | About 2 to about 10 |
| Nickel | About 30 to about 40 |
| Cobalt | About 20 to about 25 |

The cement copper will have a composition falling within the following range:

| Constituents | Percentages |
|---|---|
| Copper | About 50 to about 60 |
| Nickel | About 35 to about 45 |
| Iron | About 0.3 to about 0.5 |
| Cobalt | About 0.5 to about 0.8 |

The filtrate from the cement copper will have a composition falling within the following range:

| Constituents | Grams per liter |
|---|---|
| Iron | About 0.001 to about 0.003 |
| Copper | About 0.0001 to about 0.001 |
| Manganese | About 0.03 to about 0.05 |
| Nickel | About 35 to about 55 |
| Cobalt | About 20 to about 25 |

The first purified cobalt slime will have a composition falling within the following range:

| Constituents | Percentages |
|---|---|
| Manganese | About 0.08 to about 0.16 |
| Nickel | About 2 to about 4 |
| Cobalt | About 53 to about 55 |

The filtrate from the first purified cobalt slimes will have a composition falling within the following range:

| Constituents | Grams per liter |
| --- | --- |
| Nickel | About 20 to about 30 |
| Cobalt | About 0.1 to about 0.5 |

The purified roasted product will have a composition falling within the following range:

| Constituents | Percentages |
| --- | --- |
| Cobalt oxide | About 70 to about 71 |
| Nickel oxide | About 0.6 to about 0.8 |
| Iron | About 0.1 to about 0.2 |
| Copper | About 0.01 to about 0.10 |
| Sulfur | About 0.02 to about 0.03 |
| Arsenic | About 0.001 to about 0.003 |
| Lead | About 0.0005 to about 0.001 |

In carrying out the process described hereinbefore, it has been possible to recover about 94 per cent to about 96 per cent of the cobalt present in the original impure cobalt slimes.

The present invention provides a process which is of particular importance to the electrolytic refining of nickel. It has been found that by precipitating the iron, lead, arsenic and cobalt simultaneously, electrolytic nickel containing not more than $\frac{1}{10}$ per cent cobalt can be produced.

Although the present invention has been described in conjunction with certain preferred embodiments thereof, those skilled in the art will readily understand that modifications and variations thereof can be made. Such modifications and variations are to be considered within the purview of the specification and the scope of the appended claims.

I claim:

1. A process for recovering cobalt from cobalt-containing material having nickel and appreciable amounts of iron and copper present which comprises making an aqueous suspension of material containing cobalt, nickel, iron and copper in the oxidized state, introducing sulfur dioxide into said suspension in amount sufficient to reduce practically all of the cobalt and nickel compounds and at least a part of the iron therein, adding sufficient of a strong mineral acid to dissolve said reduced cobalt and nickel compounds and to form a solution containing cobalt and nickel salts, introducing into said solution sufficient material containing iron, cobalt and nickel in the oxidized state to oxidize the reduced iron but not the cobalt and nickel to oxidize the iron and to raise the pH of said solution to that pH at which ferric salts hydrolyze, hydrolyzing the oxidized iron to obtain an aqueous suspension of a precipitate of iron, separating said iron precipitate from said aqueous suspension to provide a solution containing copper, cobalt and nickel, removing copper from said solution by cementation to obtain a solution substantially devoid of iron and copper and containing substantially all of the cobalt and nickel, and recovering cobalt containing only small amounts of nickel and substantially devoid of iron and copper.

2. A process for recovering cobalt from material containing nickel, copper and appreciable amounts of iron which comprises making an aqueous suspension of material containing cobalt, nickel, iron and copper in the oxidized state, introducing sulfur dioxide into said suspension in amount sufficient to reduce practically all of the cobalt and nickel compounds and at least a part of the iron compounds, adding sufficient of a strong mineral acid to dissolve said reduced cobalt and nickel compounds and to form a solution containing cobalt and nickel salts, adding sufficient material containing iron, cobalt and nickel in the oxidized state to oxidize the reduced iron but not the cobalt and nickel, raising the pH of said solution to a pH at which ferric salts hydrolyze, hydrolyzing the oxidized iron to obtain an aqueous solution containing a precipitate of iron, separating said iron precipitate from said aqueous suspension to provide a solution containing nickel, cobalt and copper, removing copper by cementation to obtain a solution containing cobalt and nickel salts substantially devoid of iron and copper, oxidizing at least a major portion of said cobalt, precipitating said oxidized cobalt contaminated with nickel, separating said contaminated cobalt from the solution, and purifying said contaminated cobalt to obtain a cobalt-containing material substantially devoid of iron and copper and containing not more than about 1% of nickel.

3. A process for recovering cobalt from material containing cobalt, nickel, copper and more than traces of iron in the oxidized state which comprises making an aqueous suspension of material containing cobalt, nickel, iron and copper in the oxidized state, introducing sulfurous anhydride into said suspension in amount sufficient to reduce all of the cobalt and nickel and at least a portion of the iron, introducing sufficient of a strong acid into said solution to provide a pH not higher than about pH 2.0 to dissolve the reduced cobalt and nickel, adding sufficient material containing iron, cobalt and nickel in the oxidized state to oxidize said reduced iron but not the cobalt and nickel in said solution having a pH not greater than about pH 2.0, raising the pH of said solution to that pH at which ferric salts hydrolyze, hydrolyzing the oxidized iron to obtain an aqueous suspension containing a precipitate of iron, separating said iron precipitate from said aqueous suspension to obtain an aqueous solution substantially devoid of iron and containing cobalt, nickel and copper, removing copper from said solution by cementation to obtain an aqueous solution substantially devoid of iron and copper, and recovering cobalt containing only small amounts of nickel.

4. A process for recovering cobalt from material containing cobalt, nickel, copper and more than traces of iron which comprises making an aqueous suspension of material containing cobalt, nickel, copper and appreciable amounts of iron in the oxidized state, introducing sulfur dioxide into said suspension until at least a portion of the iron is reduced together with practically all of the cobalt and nickel, adding sufficient sulfuric acid to bring the pH of the aqueous suspension to below about pH 2.0 to provide a solution containing reduced iron, cobalt and nickel, introducing sufficient material containing iron, cobalt and nickel in the oxidized state to oxidize said reduced iron, but to leave the cobalt and nickel in the reduced state to obtain a reaction mass having a pH not greater than about pH 4.5 in which practically all of the iron is in the oxidized state and practically all of the cobalt and nickel are present as soluble salts of cobalt and nickel in the reduced state, hydrolyzing the oxidized iron compound to obtain a suspension containing a precipitate of iron, separating said iron precipitate from said suspension to obtain a solution substantially devoid of iron and containing soluble salts of cobalt, nickel and copper, removing copper by cementation to obtain a solution substantially devoid of iron and copper, and recovering cobalt containing only small amounts of nickel.

5. A process for recovering cobalt which comprises establishing an aqueous solution containing nickel and at least some cobalt, iron, copper, arsenic and lead in the reduced state, passing oxygen-containing gas selected from the group consisting of oxygen and air through said aqueous solution to obtain a reaction mass containing iron in the oxidized state, introducing chlorine into the aqueous solution to obtain a reaction mass containing cobalt, lead and arsenic together with iron in the oxidized state, hydrolyzing said oxidized iron to obtain a reaction mass containing a first precipitate of cobalt, iron, arsenic, lead, copper and nickel; suspending said precipitate in an aqueous medium, introducing sufficient sulfur dioxide into said aqueous medium to reduce practically all of the cobalt and nickel and at least a part of the iron; adding sufficient sulfuric acid to said aqueous medium to bring the pH of said aqueous medium to below about pH 2.0 to obtain an aqueous medium containing soluble salts of cobalt, nickel and iron in the reduced state together with compounds of copper; adding sufficient of an oxidizing agent comprising said first precipitate to oxidize the reduced iron but not the cobalt and nickel, to provide a solution having a pH of about pH 4.5 in which practically all of the iron is present in the oxidized state and practically all of the cobalt and nickel are present as soluble salts of reduced cobalt and nickel; hydrolyzing said oxidized iron to obtain a precipitate of oxidized iron, lead and arsenic; separating said precipitate containing iron, lead and arsenic from said aqueous medium to obtain a solution containing cobalt and nickel in the reduced state and copper; removing copper from said solution to obtain a solution of cobalt and nickel in the reduced state substantially devoid of copper, iron, lead and arsenic; and recovering cobalt containing only small amounts of nickel.

LOUIS SECONDO RENZONI.